US011490439B2

United States Patent
Hasnain et al.

(10) Patent No.: US 11,490,439 B2
(45) Date of Patent: Nov. 1, 2022

(54) SYSTEM AND METHOD FOR PERFORMING MULTIPLE RADIO FREQUENCY ALLOCATION

(71) Applicant: Hewlett Packard Enterprise Development LP, Houston, TX (US)

(72) Inventors: Farhan Hasnain, Santa Clara, CA (US); Kannan Konath, Santa Clara, CA (US); James Jay Friedmann, Santa Clara, CA (US); Deven Patel, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 197 days.

(21) Appl. No.: 17/081,696

(22) Filed: Oct. 27, 2020

(65) Prior Publication Data

US 2022/0132606 A1 Apr. 28, 2022

(51) Int. Cl.
*H04W 76/15* (2018.01)
*H04W 72/04* (2009.01)
*H04W 72/08* (2009.01)
*H04B 1/7093* (2011.01)

(52) U.S. Cl.
CPC .......... *H04W 76/15* (2018.02); *H04B 1/7093* (2013.01); *H04W 72/0453* (2013.01); *H04W 72/085* (2013.01); *H04B 2001/70935* (2013.01)

(58) Field of Classification Search
CPC .................................................. H04W 76/15
USPC ............................................................ 370/329
See application file for complete search history.

(56) References Cited

U.S. PATENT DOCUMENTS

2021/0022007 A1* 1/2021 McFadden ............ H04W 16/14

* cited by examiner

*Primary Examiner* — Dang T Ton
(74) *Attorney, Agent, or Firm* — Yao Legal Service, Inc.

(57) ABSTRACT

One embodiment can provide a method and a system for performing multiple radio frequency allocation. During operation, the system including a controller can receive, a Wi-Fi channel allocation and a filter bank configuration associated with a Wi-Fi radio transceiver. The system can determine one or more Internet of things (IoT) radio transceivers operating with the Wi-Fi radio transceiver. For a respective IoT radio transceiver, the system can perform the following operations: determining a set of scores based on a set of constraints associated with an application type for the IoT radio transceiver; and computing a weighted average score based on the set of scores; and determining a channel allocation for the IoT radio transceiver based on the weighted average score and the Wi-Fi channel allocation.

20 Claims, 6 Drawing Sheets

— 302

| BLE ASSET TRACKING APPLICATION | | |
|---|---|---|
| CONSTRAINTS | WEIGHTAGE (%) | SCORE (1-10) |
| APPLICATION | 20 | 5.0 |
| COVERAGE RANGE | 30 | 8.0 |
| DUTY CYCLE | 20 | 7.0 |
| FREQUENCY DOMAIN EXISTENCE | 10 | 4.0 |
| FIDELITY | 10 | 3.0 |
| ERROR CORRECTION | 10 | 7.0 |
| TOTAL | 100 | 6.2 |

304

306

— 308

| ZigBee ROOM LIGHTING APPLICATION | | |
|---|---|---|
| CONSTRAINTS | WEIGHTAGE (%) | SCORE (1-10) |
| APPLICATION | 20 | 5.0 |
| COVERAGE RANGE | 30 | 4.0 |
| DUTY CYCLE | 20 | 3.0 |
| FREQUENCY DOMAIN EXISTENCE | 10 | 6.0 |
| FIDELITY | 10 | 6.0 |
| ERROR CORRECTION | 10 | 7.0 |
| TOTAL | 100 | 4.7 |

SYSTEM AND METHOD FOR PERFORMING MULTIPLE RADIO FREQUENCY ALLOCATION

BACKGROUND

Field

This disclosure is generally related to a wireless radio communication system. More specifically, this disclosure is related to a system and method for performing multiple radio frequency allocation.

Related Art

Recent advancements in wireless technologies handle the exponential growth in the demand for wireless communication services by including different wireless communication capabilities in a wide range of client devices, e.g., a laptop computer, a desktop computer, a mobile device, an Internet-of-Things device and/or other wireless devices. Further, an access point or an access device is provided that allows the different client devices to wirelessly connect to a wired network. The access device may operate as a transmitter and/or a receiver of wireless radio signals between the access device and the client device. The access device can include radio transceivers and antennas to transmit and receive radio signals.

However, some problems exist when the radio transceivers co-located in the access device operate simultaneously. Specifically, due to the large number of wireless services using the radio spectrum the availability of the radio spectrum can be limited. In other words, the radio transceivers may operate at different overlapping frequency bands within the limited available radio spectrum, which can result in significant channel interference and degradation of the radio signals. Such interference and degradation of the radio signals may significantly impact the quality of the wireless services provided by the radio transceivers that are co-located and operating simultaneously within the access device.

BRIEF DESCRIPTION OF THE FIGURES

FIG. 3 shows two exemplary tables with score distribution for a set of constraints associated with a BLE application and a ZigBee application, respectively, according to one embodiment.

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the scope of the present disclosure is not limited to the embodiments shown, but is to be accorded the widest scope consistent with the principles and features disclosed herein.

The embodiments described herein solve the technical problem of determining a channel allocation strategy for multiple radio transceivers operating simultaneously and co-located within a single physical device. Specifically, the physical device, e.g., an access point device or a connectivity gateway device, including the radio transceivers can include a decision-making mechanism that arbitrates channel allocation and filtering on multiple radio transceivers based on a set of constraints associated with an application type, thereby improving the performance of a system including multiple radio transceivers operating simultaneously.

System Architecture

Figure 1:
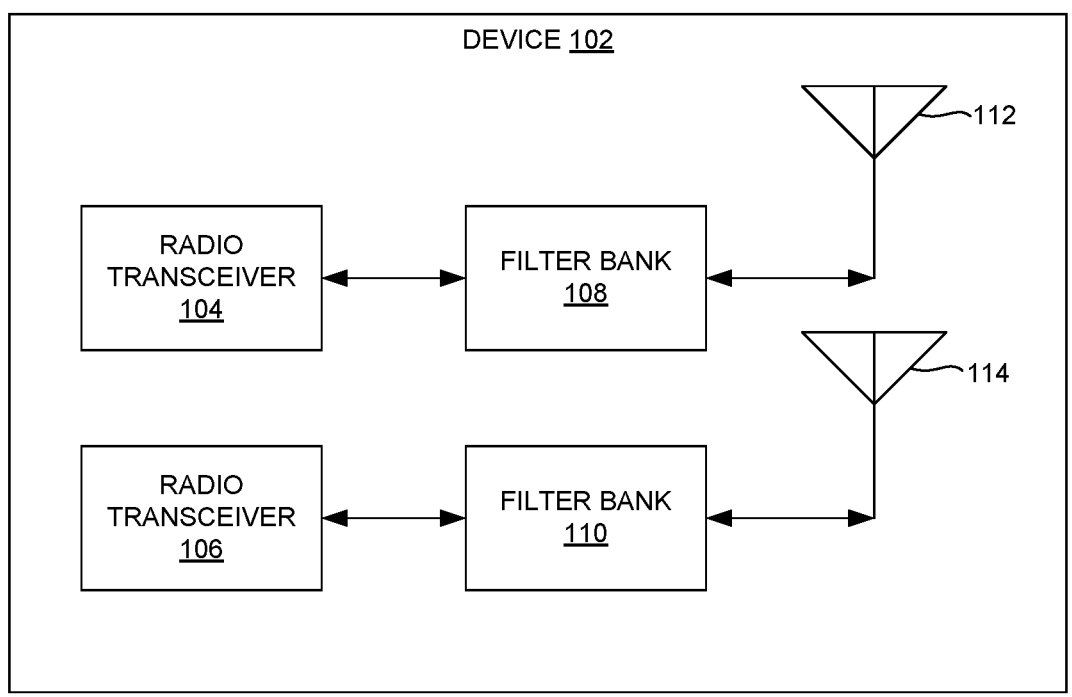
FIG. 1 illustrates an exemplary block diagram of a two-radio transceiver, according to one embodiment.

FIG. 1 illustrates an exemplary block diagram of a two-radio transceiver, according to one embodiment. In the example shown in FIG. 1, device 102 can represent an access point device or a connectivity gateway device that includes two radio transceivers, i.e., 104 and 106, operating simultaneously. Device 102 may function as a wireless connection point for client devices. The term "client device" can refer to a device that includes a processor, memory, and input/output interface for wired and/or wireless communication. For example, a client device may include a laptop computer, a desktop computer, a mobile device, an Internet-of-Things (IoT) device and/or other wireless devices. Device 102 may include a controller (not shown in FIG. 1) for managing different operations in device 102.

Device 102 can include radio antennas 112 and 114 corresponding to radio transceivers 104 and 106 respectively. Each radio antenna can include a circuitry to convert electrical signals generated by a corresponding radio transceiver into radio waves to be transmitted at a specific radio frequency. In addition, each radio antenna can convert the received radio waves to electrical signals that are sent to a corresponding radio transceiver in device 102.

Radio transceiver 104, e.g., a Wi-Fi radio transceiver, can utilize a 2.4 GHz ultra-high-frequency (UHF) radio band to transmit and/or receive radio signals using antenna 112 on different data channels, e.g., on channel 1 centered at 2412 MHz, channel 6 centered at 2437 MHz, or channel 11 centered at 2462 MHz. Radio transceiver 104 may establish a wireless local area network (WLAN) connection with client devices based on IEEE 802.11 standards.

Device 102 can include a second radio transceiver 106 that is different from radio transceiver 104, e.g., an IEEE 802.15.4 radio, operating simultaneously with Wi-Fi radio transceiver 104. In other words, radio transceiver 106 may generate radio signals from among different 802.15 technical standard variants.

Although having two radio transceivers co-located within device 102 can provide some advantages, e.g., adding additional wireless services in a single physical device, however, due to the physical proximity of the radio transceivers the operation of one transceiver may interfere with the other transceiver. Specifically, the physical proximity of Wi-Fi radio transceiver 104 and IEEE 802.15.4 radio transceiver 106 in device 102 may result in an increased demand for the utilization of the radio spectrum.

For example, in asset tracking applications, radio transceiver 106 may scan for Bluetooth Low Energy (BLE) beacons on some advertising channels, e.g., channel 37 corresponding to 2402 MHz, channel 38 corresponding to 2426 MHz, and channel 39 corresponding to 2480 MHz in the 2.4 GHz radio band. During operation of device 102, when Wi-Fi radio transceiver 104 is transmitting on any one of the channels, e.g., channels 1, 6, or 11, radio transceiver 106 (associated with an asset tracking application) can have problems with receiving beacons on its advertising channels. This is because the transmitted Wi-Fi radio signals have high energy levels, e.g., 18 dBm or 20 dBm in 2.4 GHz radio band, which can significantly interfere with the BLE radio signals.

Specifically, while the Wi-Fi radio transceiver 104 is transmitting, the transmitted Wi-Fi radios signals can have two kinds of impacts on the IEEE 802.15.4 transmit/receive radio signals. First, due to the high energy level of the Wi-Fi transmit radio signal, even if radio transceiver 104 is transmitting at 2412 MHz, some of the radio signal energy may present itself at the opposite end of the spectrum, e.g., at 2480 MHz. Since IEEE 802.15.4 radio transceiver 106 can operate at 2480 MHz, the radio signal energy due to radio transceiver 104 may reduce the sensitivity of transceiver 106. Second, the high energy level of the transmitted Wi-Fi radio signal at 2412 MHz may hinder IEEE 802.15.4 radio transceiver 106 from transmitting and/or receiving IEEE 802.15.4 radio signals on jammed channels. In other words, while Wi-Fi radio transceiver 104 is transmitting, the Wi-Fi radio signal may saturate the IEEE 802.15.4 radio channel to an extent that IEEE 802.15.4 radio transceiver 106 is incapable of receiving and/or detecting IEEE 802.15.4 beacons.

In another example, a BLE radio transceiver, i.e., radio transceiver 106, can have a sensitivity in the range from −90 dBm to −95 dBm when Wi-Fi radio transceiver 104 is not transmitting radio signals. This means that the BLE radio transceiver can capture radio signals even when they are arriving from another distant BLE radio transceiver. However, when Wi-Fi radio transceiver 104 is transmitting, e.g., on channel 11 which is centered at 2462 MHz, the high energy level of the Wi-Fi radio signals may significantly interfere with the BLE radio signals. In other words, the sensitivity of BLE radio transceiver 106 can drop from −90 dBm to −40 dBm. This drawback in a two-radio transceiver device 102 may degrade the performance and the capability of device 102 to track assets while Wi-Fi radio transceiver 104 is transmitting.

To overcome the above-mentioned drawbacks in a two-radio transceiver device 102, device 102 may include filter banks 108 and 110. Each filter bank may include a plurality of filters arranged as a bank of switchable filters. Each filter in the bank of switchable filters can include switches, e.g., two single pole three throw (SP3T) switches, for switching the filters between an activated state and a deactivated state. Each filter may correspond to a radio frequency (RF) sub-band filter for tuning to a portion of the RF band.

Wi-Fi radio transceiver 104 is coupled to switchable filter bank 108 that may include three bandpass filters controlled by two SP3T switches. The three bandpass filters may include: a first bandpass filter for Wi-Fi channel 1 centered at 2412 MHz, and Wi-Fi channel 6 centered at 2437 MHz; a second bandpass filter for Wi-Fi channel 11 centered at 2462 MHz; and a third full-band filter for all the Wi-Fi data channels in the 2.4 GHz radio band.

Filters in switchable filter bank 110 associated with radio transceiver 106 are complementary to filters in switchable filter bank 108. Complementary filters may include a pair of filters, e.g., a transmit-side filter associated with radio transceiver 104 and a receive-side filter associated with radio transceiver 106. The complementary filters are paired so that the transmit-side filter of the pair may attenuate on-channel interference resulting from the radio transceiver to which the transmit-side filter is coupled. Further, complementary filters are paired so that the receive-side filter of the pair may attenuate jamming effects resulting from the transmission by the radio transceiver to which the transmit-side filter is coupled.

For example, applying a filter at transmit side of Wi-Fi radio transceiver 104 may solve the problem due to skirt energy, i.e., the filter may attenuate the Wi-Fi radio signal energy spreading up to 2480 MHz (which is at the opposite end of the radio spectrum). Further, device 102 may also apply a filter at receiver side of IEEE 802.15.4 radio transceiver 106 to solve the jamming problem due to the fundamental signal energy from Wi-Fi radio signal. For example, when Wi-Fi radio transceiver 104 is transmitting on channel 11 at 2462 MHz, device 102 can apply a filter at the receiver side of IEEE 802.15.4 radio transceiver 106, e.g., a BLE radio transceiver, to recover the sensitivity of BLE radio transceiver, e.g., to −92 dBm sensitivity.

The integration of switchable filter banks, i.e., 108 and 110, may solve the problem due to jamming and skirt energies in a two-radio transceiver system. However, the inclusion of additional IEEE 802.15.4 radio transceivers operating simultaneously may present a different dimension of problems to be solved. Specifically, the jamming and skirt energies from Wi-Fi radio transceiver 104 may now interfere with radio signals from the plurality of IEEE 802.15.4 radio transceivers co-located within a single physical device. The following paragraphs describe a multiple radio transceiver system that provides a novel multiple radio channel allocation mechanism to solve the above-mentioned problems and to improve the performance of a device including a plurality of radio transceivers.

Figure 2:
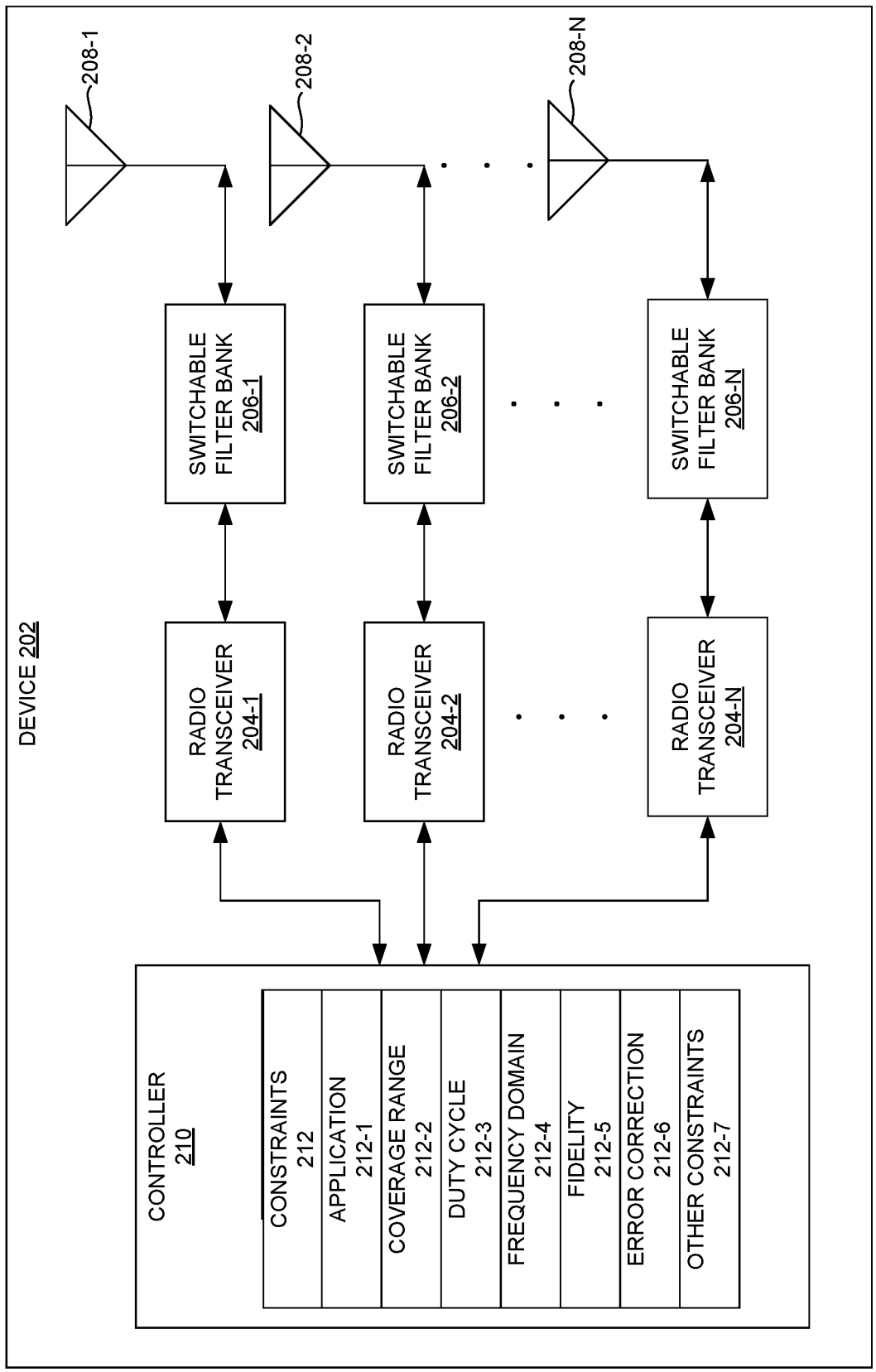
FIG. 2 illustrates an exemplary block diagram of a multiple radio transceiver system, according to one embodiment.

FIG. 2 illustrates an exemplary block diagram of a multiple radio transceiver system, according to one embodiment. In the example shown in FIG. 2, device 202, e.g., an access point device or a connectivity gateway device, can include a plurality of radio transceivers, i.e., 204-1 . . . 204-N, with a respective radio transceiver coupled to a corresponding switchable filter bank from a plurality of switchable filter banks 206-1 . . . 206-N. Furthermore, a respective switchable filter bank is coupled to a corresponding antenna from a plurality of antennas 208-1 . . . 208-N.

Device 202 can include a controller 210 that can include hardware components, e.g., application specific integrated circuits (ASICs), transistor logic, etc., and/or software components for managing switchable filter banks 206-1 . . . 206-N and channel allocation for radio transceivers 204-1 . . . 204-N.

Radio transceivers 204-2 . . . 204-N, e.g., Internet-of-Things (IoT) radio transceivers, can differ from Wi-Fi radio transceiver 204-1 and may operate simultaneously with Wi-Fi radio transceiver 204-1 in device 202. Specifically, radio transceivers 204-2 . . . 204-N can generate radio signals that correspond to different 802.15 technical standard variants. For example, some of the IEEE 802.15 technical standard variants can include Bluetooth, BLE, ZigBee, Thread, etc.

Similar to FIG. 1, each switchable filter bank can include a bank of RF sub-band filters, i.e., a plurality of bandpass filters. Each RF sub-band filter may tune to a specific portion of the RF band. Furthermore, switchable filter banks 206-1 . . . 206-N can include complementary filters (similar to the switchable filter banks in FIG. 1). In general, filters in the filter bank are invoked when an impact of an active transmitter corresponding to one among the multiple radio transceivers, e.g., a Wi-Fi radio transmitter, is desired to be diminished.

Controller 210 may allocate a specific radio channel to an IoT radio transceiver based on a function or application type associated with the IoT radio transceiver. For example, when IoT radio transceiver 204-2 is associated with ZigBee application (an IEEE 802.15.4 based wireless technology), radio transceiver 204-2 can transmit and/or receive ZigBee radio signal on channel 2405 MHz. In addition, radio transceiver 204-2 can transmit and/receive another ZigBee radio signal on channel 2420 MHz. When Wi-Fi radio transceiver 204-1 is transmitting Wi-Fi signal on channel 11 (2462 MHz), the sensitivity of ZigBee radio transceiver 204-2 can be better at channel 2405 MHz and 2420 MHz than at channels above 2440 MHz. In other words, radio channels for ZigBee radio in the middle of the radio spectrum have less coverage range than radio channels at the end of the radio spectrum. However, if an application type associated with ZigBee radio can satisfy a set of constraints even when using radio channels in the middle of the radio spectrum, then controller 210 may allocate ZigBee radio transceiver 204-2 radio frequency channels in the middle of the radio spectrum.

Therefore, depending on the application type and a set of constraints 212, controller 210 may allocate channels to different radio transceivers 204-2 . . . 204-N in device 202. Specifically, controller 210 may calculate a score for a respective radio transceiver based on set of constraints 212 associated with an application type of the radio transceiver being considered. Set of constraints 212 can include an application constraint 212-1, a coverage range constraint 212-2, a duty cycle constraint 212-3, a frequency domain existence constraint 212-4, a fidelity constraint 212-5, an error correction constraint 212-6, and may include other types of constraints 212-7 that are relevant for performing channel allocation among radio transceivers 204-2 . . . 204-N.

Multiple Radio Frequency Allocation Based on a Set of Constraints

In one embodiment, controller 210 may assume that frequency allocation for Wi-Fi radio transceiver 204-1 is already known and a corresponding filter bank has been already configured. Alternatively, channels associated with Wi-Fi radio transceiver 204-1 may vary and filter bank 206-1 is configured accordingly. Controller 210 may apply a novel frequency allocation mechanism to allocate channels to IoT radio transceivers 204-2 . . . 204-N in device 202 based on an application associated with respective radio transceivers. Specifically, controller 210 may implement a scoring algorithm to prioritize applications based on set of constraints 212, i.e., each application type can be scored differently based on set of constraints 212. In the following, constraints 212-2 . . . 212-7 are described.

Application constraint 212-1 can indicate whether an application under consideration involves active transmit and/or receive data sessions with client devices or whether the application merely involves scanning of received radio signals. For example, an application may keep track of all the devices in the vicinity of device 202 by scanning the air continuously for detecting the presence of other devices. Such scanning can provide information about the presence of other devices and their location. Alternatively, if the application is related to asset tracking, then the associated IoT radio transceiver can scan the air, e.g., tracking every 10 minutes, to satisfy the application's requirement instead of continuously scanning the air. If on the other hand, an application is required perform continuous, i.e., every radio signal arriving at the IoT radio transceiver is captured, then the application for scanning the air continuously may get a higher score than the application for performing asset tracking. Assigning a high score to a certain application may indicate that the application has critical conditions to be satisfied when compared to other applications that have non-critical conditions to be satisfied.

Coverage range constraint 212-2 can indicate a coverage range for a specific application type. For example, if the application type associated with an IoT radio transceiver indicates that radio signals are desired to be received from devices within a short range, e.g., 10 feet distance, then even a sensitivity of −70 dBm is sufficient to successfully receive the radio signal. However, if the application type associated with the IoT radio transceiver indicates that radio signals are desired to be received from devices that are far away, e.g., 100 feet, from the IoT transceiver, then the radio signal is successfully received when the sensitivity of the IoT radio transceiver is designed to be better than −90 dBm. In one embodiment, controller 210 may strategically switch the filters in each switchable filter bank, i.e., 206-1 . . . 206-N, based on an amount of receiver de-sensitization that can be tolerated for operation within desirable limits. In other words, the frequency allocation mechanism in controller 210 may implement application based dynamic ranging to satisfy the requirements associated with the application type. Therefore, the coverage range associated with a specific application type can be relevant for allocating frequencies to different IoT radio transceivers. For example, controller 210 may assign a high score to an application type that requires a higher coverage range when compared to other application types that need a low coverage range.

Duty cycle constraint 212-3 may refer to a transmit time of a power amplifier based on performance requirements of an application type. For example, short transmit duration may lead to more flexible filtering requirements in the frequency domain and vice versa. For example, when a Wi-Fi radio transceiver, e.g., 204-1, is actively transmitting, an active transmit time of other IoT radio transceivers and their corresponding application requirements can represent relevant parameters for performing channel allocation. In other words, if Wi-Fi radio transceiver 204-1 is actively transmitting packets at a high duty cycle, e.g., 500 ms, then this high duty cycle may result in limited options for performing channel allocation for other IoT radio transceivers, e.g., a BLE radio transceiver, ZigBee radio transceiver, etc. If on the other hand, the duty cycle associated with Wi-Fi radio transceiver 204-1 is relatively low, then controller 210 can have better flexibility in allocating frequency channels in the radio spectrum to the IoT radio transceivers. Therefore, duty cycle constraint 212-3 is relevant because it can impact the transmission and/or reception of radio signals on IoT radio transceivers when Wi-Fi radio transceiver is actively transmitting.

Frequency domain constraint 212-4 can refer to a frequency domain existence of a protocol. For example, device 202 may include three radio transceivers, i.e., Wi-Fi, BLE, and ZigBee radio transceivers, with Wi-Fi radio transceiver transmitting on channel 1 centered at 2412 MHz. If ZigBee radio is assigned channel 2420 MHz, then ZigBee radio may continue to stay on that channel until controller 210 changes the channel allocation. Now since Wi-Fi radio transceiver is transmitting at 2412 MHz, the ZigBee radio signal at 2420 MHz can be significantly impacted due to the high energy level of the Wi-Fi radio signal overlapping with the ZigBee radio signal. In the case of BLE radio transceiver, BLE data communication can occur on different channels because the BLE utilizes frequency hopping across channels, e.g., across all 40 channels, in the entire radio spectrum. Since BLE provides a capability of hopping across channels, controller 210 may allocate a Zigbee channel that is farther away from channel 1, thereby reducing the impact of the high energy Wi-Fi radio signal at channel 1. Therefore, depending on whether an application type associated with an IoT radio transceiver includes a capability to hop across channels or remain fixed in a specific channel, controller 210 may determine a score for frequency domain constraint 212-4.

Fidelity constraint 212-5 can refer to fidelity requirement of an application. For example, a BLE asset tracking application may receive just one packet (or channel) out of three packets for every transmitted beacon and this received packet can be sufficient to satisfy the requirements of the asset racking application. In other words, even though BLE asset tracking radio transceiver is sending a beacon at three frequencies, e.g., channel 37 (2402 MHz), channel 38 (2426 MHz), and channel 39 (2480 MHz), to get information about a location of a device, receiving just one beacon in response to the three transmitted beacons is sufficient for the application to calculate the location of the device.

Error correction constraint 212-6 can refer to an error correction capability in a radio protocol. In general, radio protocols are equipped with varying degrees of error correction capabilities, e.g., some radio protocols have good error correction capabilities, while some have moderate to poor error correction capabilities. Therefore, when device 202 includes an IoT radio transceiver that is associated with a radio protocol that has critical requirements, e.g., high fidelity, long range coverage, etc., but the radio protocol does not include an error correction capability, in such a case controller 210 may assign a high score for error correction constraint 212-6. For example, controller 210 may allocate a frequency channel that is at the end of the radio spectrum where there is less interference from the Wi-Fi radio signal or may allocate a frequency channel at which the recovery from errors is possible. However, for radio protocols that have built-in error correction capabilities, controller 210 may have additional degrees of freedom to allocate frequency channels. In other words, due to the enhanced error recovery capability of the radio protocol, controller 210 may select a frequency channel that can be subject to interference from radio signals associated with neighboring radio transceivers. Therefore, the scoring algorithm may score error correction constraint 212-6 based on the how smart the radio transceivers are for a specific radio protocol. The present disclosure is not limited to constraints 212-1 to 212-6, controller 210 may include other constraints 212-7 that are relevant to performing frequency allocation for radio transceivers.

FIG. 3 shows two exemplary tables with score distribution for a set of constraints associated with a BLE application and a ZigBee application, respectively, according to one embodiment. Table 302 shows an example distribution of different scores and weights associated with a set of constraints for a BLE asset tracking application. For example, for the BLE asset tracking application, coverage range 304 is considered as an important constraint, therefore the scoring algorithm may apply a score of 8.0 to the coverage range constraint and a weight of 30% (shown in row 304 in table 302). The scoring algorithm may then compute a weighted sum of the scores to generate a total weighted score 306 for the BLE asset tracking application, i.e., an average weighted score of 6.2.

Table 308 illustrates an example distribution of different scores and weights associated the set of constraints for a ZigBee room lighting application. For example, similar to the BLE asset tracking application, the coverage range for the ZigBee room lighting application may also be an important constraint. Although the scoring algorithm may apply a lower score than the BLE asset tracking application, the overall weight of 30% (shown in row 310 in table 308) is identical. The scoring algorithm may then compute a weighted sum of the scores to generate a total weighted score 312, e.g., 4.7, for the ZigBee application.

For example, if Wi-Fi radio transceiver is actively transmitting radio signals and it is desired to add BLE as a tracking radio and ZigBee as lighting radio, then BLE may get a high score (which is the case shown in FIG. 3), i.e., BLE has an overall average weighted score of 6.2 while ZigBee has a weighted score of 4.7. Specifically, since BLE radio can hop across channels, the system can allocate channel 2402 MHz or another channel on which the performance criteria for the BLE asset tracking application is satisfied. The system may allocate ZigBee radio a fixed channel, e.g., 2440 MHz or 2435 MHz based on a sensitivity requirement that is to be satisfied. The scoring algorithm assigns a lower score of 4.7 for the ZigBee room lighting application, this is because the ZigBee room lighting application may not have critical requirements to be satisfied. In other words, for a successful operation of the ZigBee room lighting application, a sensitivity that is even 20% less than the desired sensitivity is sufficient.

Furthermore, based on the application type the scoring algorithm may provide a high score for a radio when the coverage range is long, has a high duty cycle, poor error correction capability, etc. On the other hand, the scoring algorithm may provide a low score to a radio when the radio protocol utilizes hopping across channels, has strong error correction capability, etc. Based on the scoring and the overall average weighted score, a multiple radio frequency allocation mechanism may strategically allocate frequencies to different radio transceivers operating simultaneously in a single physical device.

Figure 4:
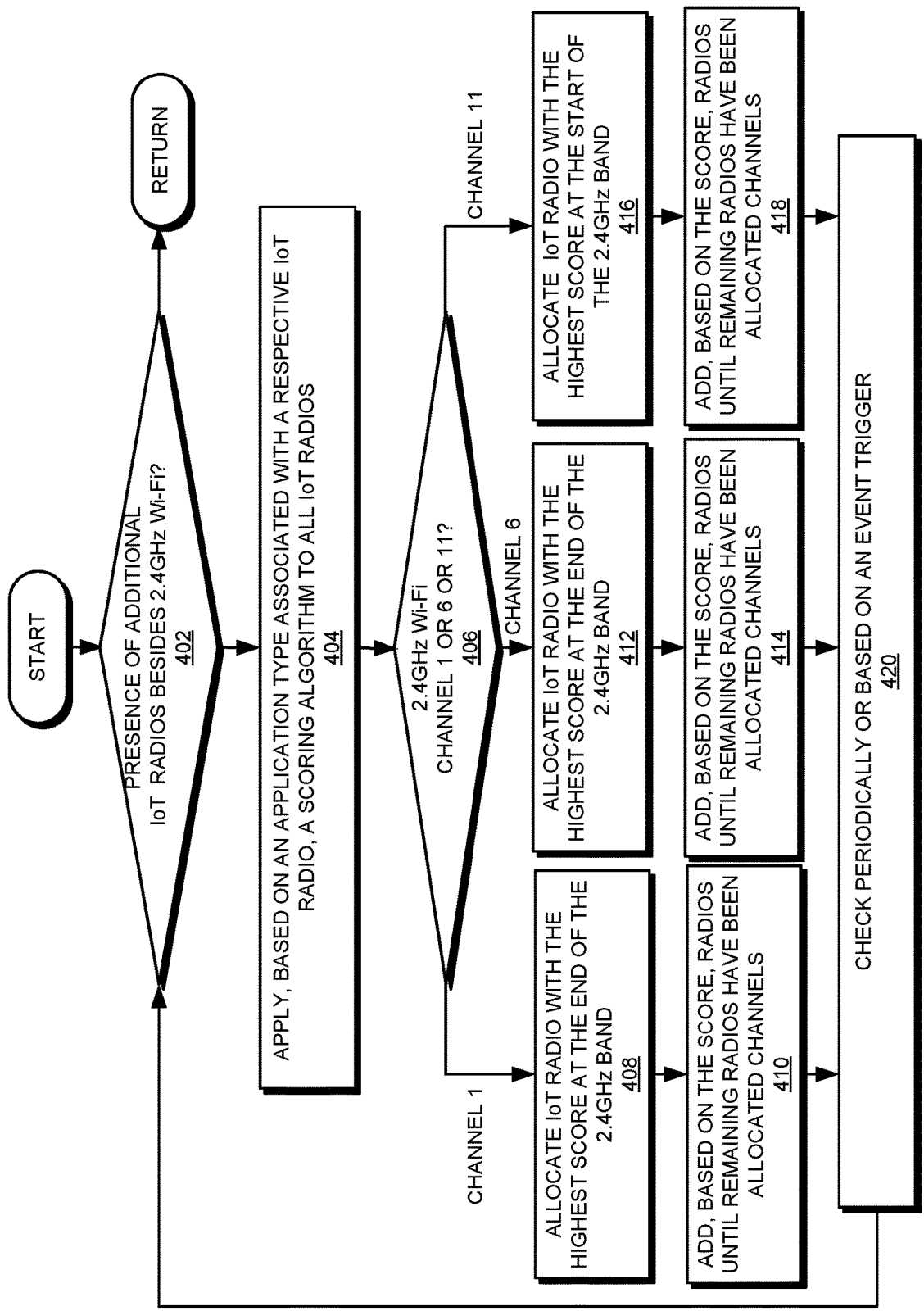
FIG. 4 presents a flowchart illustrating a process for performing multiple radio frequency allocation, according to one embodiment.

FIG. 4 presents a flowchart illustrating a process for performing multiple radio frequency allocation, according to one embodiment. During operation, a system, e.g., a controller integrated in a device, may receive a Wi-Fi channel allocation and a filter bank configuration associated with a Wi-Fi radio transceiver located within a device. The system can then determine whether one or more IoT radio transceivers are co-existing with the Wi-Fi radio transceiver (operation 402). When the condition in operation 402 is not satisfied, the operation returns. In response to the system identifying one or more IoT radio transceivers co-existing with the Wi-Fi radio transceiver, the system may apply a scoring algorithm to all the IoT radio transceivers co-located in the device (operation 404). The scoring algorithm may determine a score for each constraint in a set of constraints based on an application type associated with a respective IoT radio transceiver. The scoring algorithm may then compute a weighted sum of the scores to determine an overall weighted score for the respective IoT radio application type. Next, the system may identify a channel number or frequencies on which the Wi-Fi radio transceiver is transmitting radio signals, e.g., channel 1 centered at 2412 MHz, or channel 6 centered at 2437 MHz, or channel 11 centered at 2462 MHz, (operation 406).

When the system identifies that Wi-Fi radio transceiver is transmitting on channel 1, the system may allocate an IoT radio transceiver with a highest score a channel that is at the end of the 2.4 GHz radio band (operation 408). In other words, the IoT radio transceiver with the highest score can correspond to a radio application with highest critical requirements when compared to the requirements of the other IoT radio application types. The system may then continue to allocate frequencies to other IoT radio transceivers based on their respective weighted average score, e.g., according to a descending order of the weighted average scores, until the remaining radios have been allocated (operation 410).

Specifically, in response to the system allocating a first IoT radio transceiver corresponding to the highest score with a frequency at the end of 2.4 GHz radio band, the system may identify a second IoT radio transceiver with a next highest score and allocate a next frequency that is to the left of the frequency allocated to the first IoT radio transceiver. Similarly, the system may allocate frequencies to the remaining IoT radio transceivers based on their respective scores.

The system may engage filters in the filter banks only when the Wi-Fi radio transceiver is actively transmitting. The system may then monitor the performance of the device periodically and/or monitor an event trigger to re-allocate channels to the IoT radio transceivers (operation 420). In response to the system detecting an event, operation of the system may continue to label 402.

When the system identifies that Wi-Fi radio transceiver is transmitting on channel 6 (operation 406), the system may allocate IoT radio transceiver with the highest score to a channel at the end of 2.4 GHz radio band (operation 412). In response to the system allocating a first IoT radio transceiver corresponding to the highest score with a frequency at the end of 2.4 GHz radio band, the system may identify a second IoT radio transceiver with a next highest score and allocate a next frequency that is to the left of the frequency allocated to the first IoT radio transceiver. Similarly, the system may allocate frequencies to the remaining IoT radio transceivers based on their respective scores (operation 414). The system may then monitor the performance of the device periodically and/or monitor an event trigger to re-allocate channels to the IoT radio transceivers (operation 420). In response to the system detecting an event, operation of the system may continue to label 402.

When the system identifies that the Wi-Fi radio transceiver is transmitting on channel 11 (operation 406), the system may allocate IoT radio transceiver with the highest score to a frequency channel at the start of the 2.4 GHz radio band (operation 416). In response to the system allocating a first IoT radio transceiver corresponding to the highest score with a frequency at the start of 2.4 GHz radio band, the system may identify a second IoT radio transceiver with a next highest score and allocate a next frequency that is to the right of the frequency allocated to the first IoT radio transceiver. Similarly, the system may allocate frequencies to the remaining IoT radio transceivers based on their respective scores (operation 418). The system may then monitor the performance of the device periodically and/or monitor an event trigger to re-allocate channels to the IoT radio transceivers (operation 420). In response to the system detecting an event, operation of the system may continue to label 402.

Exemplary Computer System and Apparatus

Figure 5:
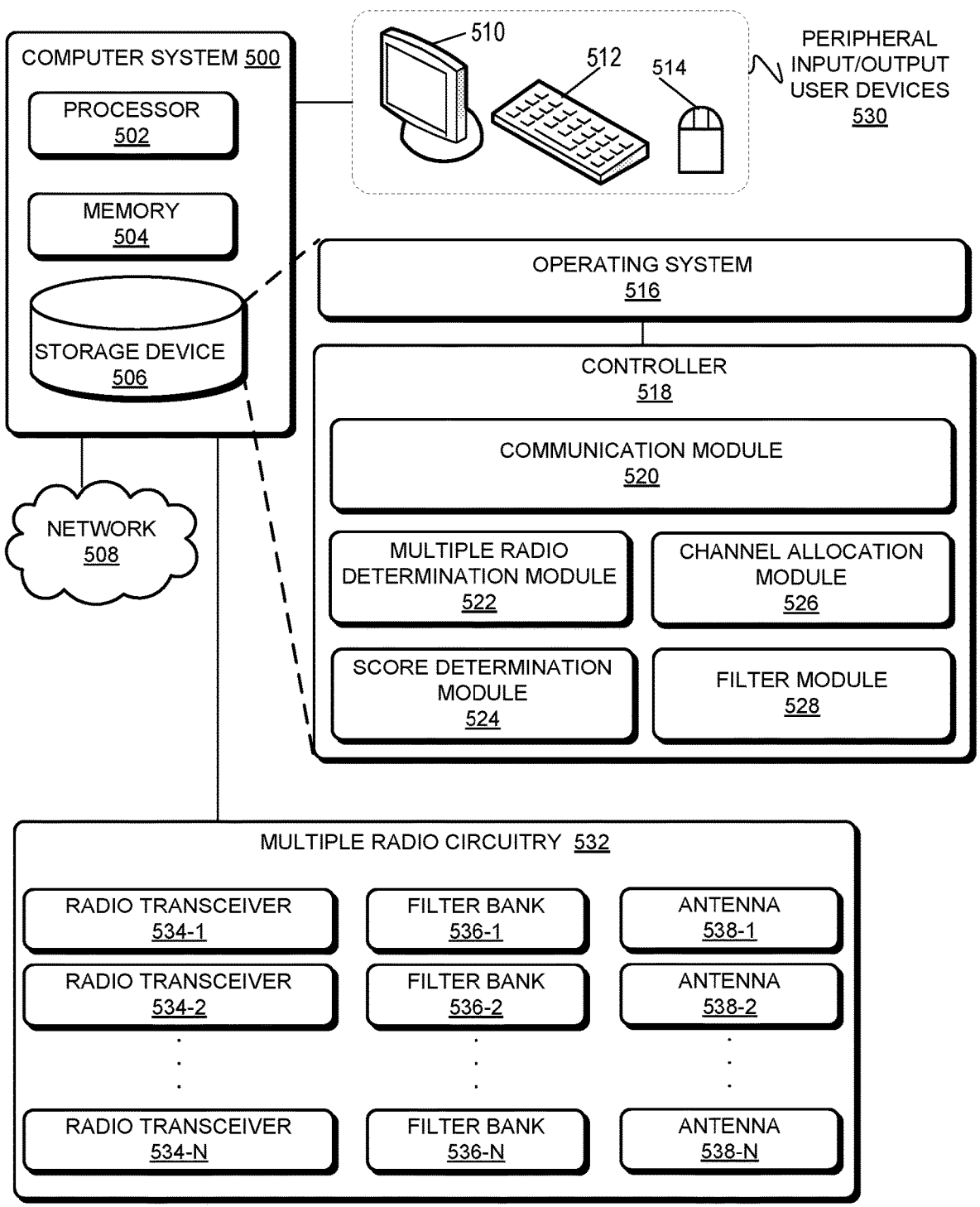
FIG. 5 illustrates an exemplary computer system that facilitates multiple radio frequency allocation, according to one embodiment.

FIG. 5 illustrates an exemplary computer system that facilitates multiple radio frequency allocation, according to one embodiment. In this example, computer system 500 can include a processor 502, a memory 504, and a storage device 506. Computer system 500 can be coupled to peripheral input/output (I/O) user devices 530, e.g., a display device 510, a keyboard 512, and a pointing device 514, and can also be coupled via one or more network interfaces to network 508. Storage device 506 can store instructions for an operating system 516 and a controller 518. Further, computer system 500 can communicate with a multiple radio circuitry 532 including radio transceivers 534-1 . . . 534-N with a corresponding set of filter banks 536-1 . . . 536-N, and a set of antennas 538-1 . . . 538-N.

In one embodiment, controller 518 can include instructions, which when executed by processor 502 can cause computer system 500 to perform methods and/or processes described in this disclosure. Controller 518 can include a communication module 520 to receive a Wi-Fi channel allocation and a filter bank configuration associated with a Wi-Fi radio transceiver, e.g., a radio transceiver 534-1 in multiple radio circuitry 532. Controller 518 can further include instructions implementing a multiple radio determination module 522 for determining one or more IoT radio transceivers co-existing with the Wi-Fi radio transceiver in multiple radio transceiver circuitry 532.

Controller 518 can include a score determination module 524, which can apply a scoring algorithm to determine a set of scores corresponding to a set of constraints associated with an application type of a respective IoT radio transceiver, i.e., 534-2 . . . 534-N. Further, score determination module 524 can compute a weighted sum of the scores for the set of constraints to determine an overall weighted score for a respective IoT radio transceiver. Controller 518 can also include a channel allocation module 526 for strategically allocating frequencies to different radio transceivers 534-2 . . . 534-N based on their corresponding overall weighted scores and the Wi-Fi channel allocation. Controller 518 can further include a filter module 528 to manage filter banks 536-1 to 536-N in multiple radio circuitry 532.

Communication module 520 can further include instructions to periodically monitor the performance of multiple radio circuitry 532 or may monitor a presence of an event trigger. In response to receiving an event trigger or determining that the performance of multiple radio circuitry 532 had changed, controller 518 may apply modules 522, 524, 526, and 528 to re-allocate channels to radio transceivers 534-1 . . . 534-N.

Figure 6:
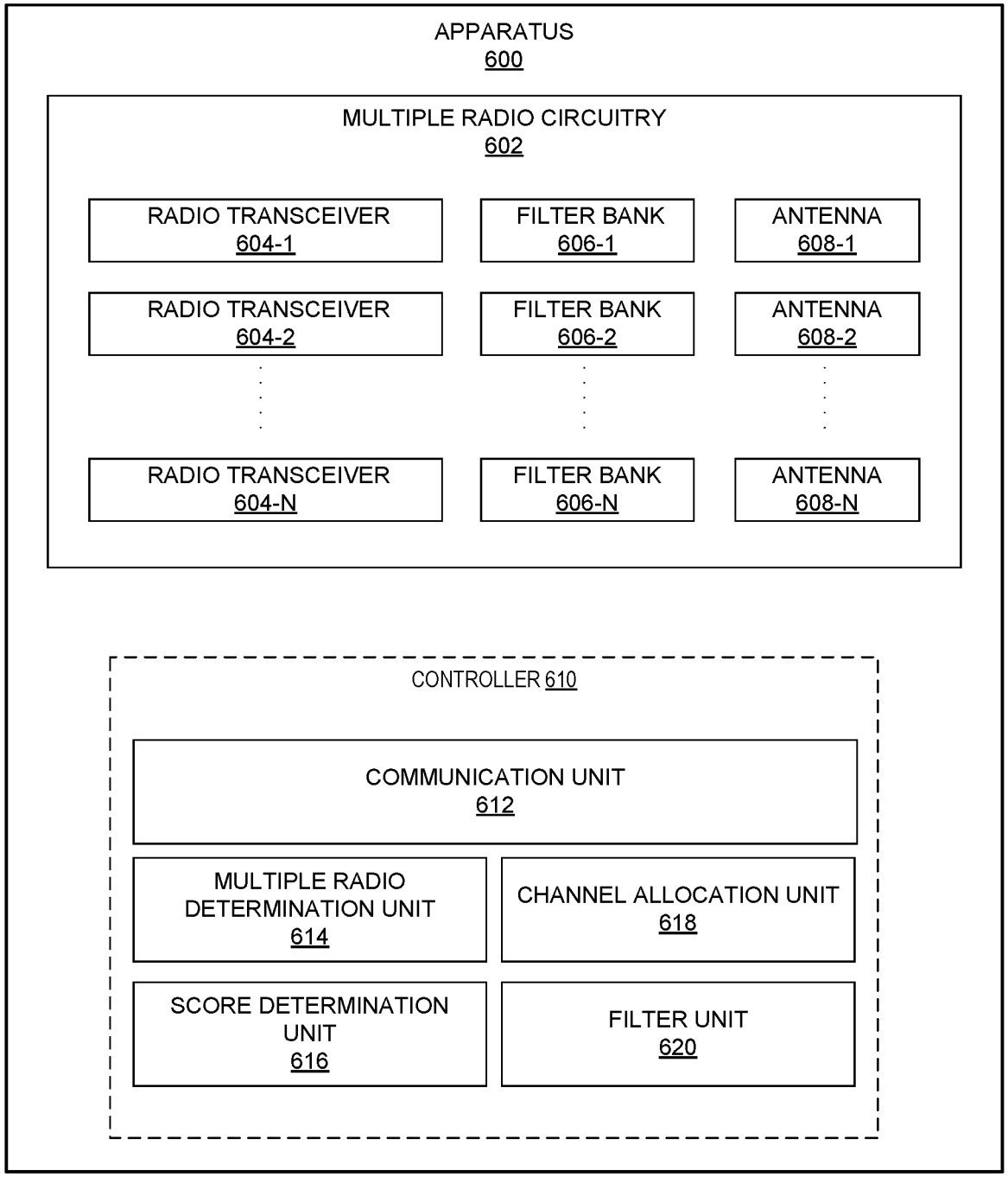
FIG. 6 illustrates an exemplary apparatus that facilitates multi-radio frequency allocation, according to one embodiment.

FIG. 6 illustrates an exemplary apparatus that facilitates multi-radio frequency allocation, according to one embodiment. Apparatus 600 can include units 612-618, which perform functions or operations similar to modules 520-528 of computer system 500 in FIG. 5, respectively. Apparatus 600 can include a controller 610 which can further include: a communication unit 612, a multiple radio determination unit 614, a score determination unit 616, a channel allocation unit 618, and a filter unit 620. Apparatus 600 can further include a multiple radio circuitry 602 with multiple radio transceivers 604-1 . . . 604-N, with corresponding filter banks 606-1 . . . 606-N, and antennas 608-1 . . . 608-N.

One embodiment can provide a method and a system for performing multiple radio frequency allocation. During operation, the system including a controller can receive, a Wi-Fi channel allocation and a filter bank configuration associated with a Wi-Fi radio transceiver. The system can determine one or more Internet of things (IoT) radio transceivers operating with the Wi-Fi radio transceiver. For a respective IoT radio transceiver, the system can perform the following operations: determining a set of scores based on a set of constraints associated with an application type for the IoT radio transceiver; and computing a weighted average score based on the set of scores; and determining a channel allocation for the IoT radio transceiver based on the weighted average score and the Wi-Fi channel allocation.

In a variation on this embodiment, the system can order the IoT radio transceivers based on a descending order of weighted average scores, with a respective weighted average score corresponding to an IoT radio transceiver. The system can then allocate a respective IoT radio transceiver with a radio channel in a 2.4 GHz radio band, based on the ordering of the IoT radio transceivers and a threshold number of radio channel allocations for a given Wi-Fi channel allocation.

In a variation on this embodiment, the system can determine the set of scores based on the set of constraints associated with the application type for the IoT radio transceiver, by applying one or more of the following operations: determining an application constraint score; determining a coverage range constraint score; determining a duty cycle constraint score; determining a frequency domain constraint score; determining a fidelity constraint score; and determining an error correction constraint score.

In a variation on this embodiment, the system can determine the application constraint score by: determining, based on the application type, a communication mode associated with the IoT radio transceiver, wherein the communication mode includes transmission, reception, or both; and determining the application constraint score for the IoT radio transceiver based on the communication mode and the application type.

In a variation on this embodiment, the system can determine the coverage range constraint score by: determining a coverage range associated with the application type, wherein the coverage range provides an insight into a desirable sensitivity for the IoT radio transceiver; and determining, based on the coverage range, the coverage range constraint score for the IoT radio transceiver.

In a variation on this embodiment, the system can determine the duty cycle constraint score by: determining, based on performance specifications for the application type, a duty cycle associated with the IoT radio transceiver, wherein the duty cycle provides insight into a set of filter specifications in the frequency domain corresponding to the IoT radio transceiver; and determining, based on the duty cycle and the application type, the duty cycle constraint score.

In a variation on this embodiment, the system can determine the frequency domain constraint score by: determining, based on the application type, a frequency domain existence of a protocol associated with the IoT radio transceiver, wherein the frequency domain existence of the protocol indicates whether the protocol allows hopping across channels; and determining, based on the frequency domain existence of the protocol, the frequency domain constraint score.

In a variation on this embodiment, the system can determine the fidelity constraint score and the error correction constraint score by: determining, based on a fidelity associated with the application type, the fidelity constraint score; and determining, based on an error correction capability of a radio protocol associated with the IoT radio transceiver, the error correction constraint score In a further variation, the IoT radio transceivers can correspond to two or more of IEEE 802.15.4 protocol-based radio transceivers.

In a further variation, the Wi-Fi radio transceiver can utilize a 2.4 gigahertz ultra-high-frequency (UHF) radio band.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments have been presented for purposes of illustration and description only. They are not intended to be exhaustive or to limit the scope of this disclosure to the forms disclosed. Accordingly, many modifications and variations will be apparent to practitioners skilled in the art.

What is claimed is:

1. A method comprising:
 receiving, by a controller, a Wi-Fi channel allocation and a filter bank configuration associated with a Wi-Fi radio transceiver;
 determining one or more Internet of things (IoT) radio transceivers operating with the Wi-Fi radio transceiver;
 for a respective IoT radio transceiver:
  determining a set of scores based on a set of constraints associated with an application type for the IoT radio transceiver; and
  computing a weighted average score based on the set of scores; and
  determining a channel allocation for the IoT radio transceiver based on the weighted average score and the Wi-Fi channel allocation.

2. The method of claim 1, further comprising:
 ordering the IoT radio transceivers based on a descending order of weighted average scores, wherein a respective weighted average score corresponds to an IoT radio transceiver; and
 allocating a respective IoT radio transceiver with a radio channel in a 2.4 GHz radio band, based on the ordering of the IoT radio transceivers and a threshold number of radio channel allocations for a given Wi-Fi channel allocation.

3. The method of claim 1, wherein determining the set of scores based on the set of constraints associated with the application type for the IoT radio transceiver, comprises one or more of:
 determining an application constraint score;
 determining a coverage range constraint score;
 determining a duty cycle constraint score;
 determining a frequency domain constraint score;
 determining a fidelity constraint score; and
 determining an error correction constraint score.

4. The method of claim 3, wherein determining the application constraint score comprises:
 determining, based on the application type, a communication mode associated with the IoT radio transceiver, wherein the communication mode includes transmission, reception, or both; and
 determining the application constraint score for the IoT radio transceiver based on the communication mode and the application type.

5. The method of claim 3, wherein determining the coverage range constraint score comprises:
   determining a coverage range associated with the application type, wherein the coverage range provides an insight into a desirable sensitivity for the IoT radio transceiver; and
   determining, based on the coverage range, the coverage range constraint score for the IoT radio transceiver.

6. The method of claim 3, wherein determining the duty cycle constraint score comprises:
   determining, based on performance specifications for the application type, a duty cycle associated with the IoT radio transceiver, wherein the duty cycle provides insight into a set of filter specifications in the frequency domain corresponding to the IoT radio transceiver; and
   determining, based on the duty cycle and the application type, the duty cycle constraint score.

7. The method of claim 3, wherein determining the frequency domain constraint score comprises:
   determining, based on the application type, a frequency domain existence of a protocol associated with the IoT radio transceiver, wherein the frequency domain existence of the protocol indicates whether the protocol allows hopping across channels; and
   determining, based on the frequency domain existence of the protocol, the frequency domain constraint score.

8. The method of claim 3, wherein determining the fidelity constraint score and the error correction constraint score comprises:
   determining, based on a fidelity associated with the application type, the fidelity constraint score; and
   determining, based on an error correction capability of a radio protocol associated with the IoT radio transceiver, the error correction constraint score.

9. The method of claim 1, wherein the IoT radio transceivers correspond to two or more of IEEE 802.15.4 protocol-based radio transceivers; and
   wherein the Wi-Fi radio transceiver utilizes a 2.4 gigahertz ultra-high-frequency (UHF) radio band.

10. A computer system, comprising:
    a processor; and
    a storage device coupled to the processor and storing instructions, which when executed by the processor cause the processor to perform a method, the method comprising:
    receiving, by a controller, a Wi-Fi channel allocation and a filter bank configuration associated with a Wi-Fi radio transceiver;
    determining one or more Internet of things (IoT) radio transceivers operating with the Wi-Fi radio transceiver;
    for a respective IoT radio transceiver:
      determining a set of scores based on a set of constraints associated with an application type for the IoT radio transceiver; and
      computing a weighted average score based on the set of scores; and
      determining a channel allocation for the IoT radio transceiver based on the weighted average score and the Wi-Fi channel allocation.

11. The computer system of claim 10, the method further comprising:
    ordering the IoT radio transceivers based on a descending order of weighted average scores, wherein a respective weighted average score corresponds to an IoT radio transceiver; and
    allocating a respective IoT radio transceiver with a radio channel in a 2.4 GHz radio band, based on the ordering of the IoT radio transceivers and a threshold number of radio channel allocations for a given Wi-Fi channel allocation.

12. The computer system of claim 10, wherein determining the set of scores based on the set of constraints associated with the application type for the IoT radio transceiver, comprises one or more of:
    determining an application constraint score;
    determining a coverage range constraint score;
    determining a duty cycle constraint score;
    determining a frequency domain constraint score;
    determining a fidelity constraint score; and
    determining an error correction constraint score.

13. The computer system of claim 12, wherein determining the application constraint score comprises:
    determining, based on the application type, a communication mode associated with the IoT radio transceiver, wherein the communication mode includes transmission, reception, or both; and
    determining the application constraint score for the IoT radio transceiver based on the communication mode and the application type.

14. The computer system of claim 12, wherein determining the coverage range constraint score comprises:
    determining a coverage range associated with the application type, wherein the coverage range provides an insight into a desirable sensitivity for the IoT radio transceiver; and
    determining, based on the coverage range, the coverage range constraint score for the IoT radio transceiver.

15. The computer system of claim 12, wherein determining the duty cycle constraint score and the frequency domain constraint score comprises:
    determining, based on performance specifications for the application type, a duty cycle associated with the IoT radio transceiver, wherein the duty cycle provides insight into a set of filter specifications in the frequency domain corresponding to the IoT radio transceiver;
    determining, based on the duty cycle and the application type, the duty cycle constraint score;
    determining, based on the application type, a frequency domain existence of a protocol associated with the IoT radio transceiver, wherein the frequency domain existence of the protocol indicates whether the protocol allows hopping across channels; and
    determining, based on the frequency domain existence of the protocol, the frequency domain constraint score.

16. An apparatus, comprising:
    a plurality of Internet of Things (IoT) radio transceivers;
    a Wi-Fi radio transceiver;
    a plurality of switchable filter banks coupled to corresponding IoT radio transceivers and the Wi-Fi radio transceiver;
    a set of antennas coupled to corresponding switchable filter banks; and
    a controller coupled to the IoT radio transceivers and the Wi-Fi radio transceiver, wherein the controller is configured to
      receive a Wi-Fi channel allocation and a filter bank configuration associated with the Wi-Fi radio transceiver;

determine one or more Internet of things (IoT) radio transceivers operating with the Wi-Fi radio transceiver;

for a respective IoT radio transceiver:
determine a set of scores based on a set of constraints associated with an application type for the IoT radio transceiver; and
compute a weighted average score based on the set of scores; and
determine a channel allocation for the IoT radio transceiver based on the weighted average score and the Wi-Fi channel allocation.

17. The apparatus of claim 16, wherein the controller is further configured to:
order the IoT radio transceivers based on a descending order of weighted average scores, wherein a respective weighted average score corresponds to an IoT radio transceiver; and
allocate a respective IoT radio transceiver with a radio channel in a 2.4 GHz radio band, based on the ordering of the IoT radio transceivers and a threshold number of radio channel allocations for a given Wi-Fi channel allocation.

18. The apparatus of claim 16, wherein the controller is configured to determine the set of scores based on the set of constraints associated with the application type for the IoT radio transceiver by performing one or more of:
determining an application constraint score;
determining a coverage range constraint score;
determining a duty cycle constraint score;
determining a frequency domain constraint score;
determining a fidelity constraint score; and
determining an error correction constraint score.

19. The apparatus of claim 18, wherein determining the application constraint score comprises:
determining, based on the application type, a communication mode associated with the IoT radio transceiver, wherein the communication mode includes transmission, reception, or both; and
determining the application constraint score for the IoT radio transceiver based on the communication mode and the application type.

20. The apparatus of claim 18, wherein determining the coverage range constraint score, the duty cycle constraint score and the frequency domain constraint score comprises:
determining a coverage range associated with the application type, wherein the coverage range provides an insight into a desirable sensitivity for the IoT radio transceiver;
determining, based on the coverage range, the coverage range constraint score for the IoT radio transceiver;
determining, based on performance specifications for the application type, a duty cycle associated with the IoT radio transceiver, wherein the duty cycle provides insight into a set of filter specifications in the frequency domain corresponding to the IoT radio transceiver;
determining, based on the duty cycle and the application type, the duty cycle constraint score;
determining, based on the application type, a frequency domain existence of a protocol associated with the IoT radio transceiver, wherein the frequency domain existence of the protocol indicates whether the protocol allows hopping across channels; and
determining, based on the frequency domain existence of the protocol, the frequency domain constraint score.

\* \* \* \* \*